(12) United States Patent
Matsuno et al.

(10) Patent No.: US 6,223,124 B1
(45) Date of Patent: Apr. 24, 2001

(54) ROUTE CONSIDERATION APPARATUS

(75) Inventors: Koji Matsuno; Munenori Matsuura; Toshihiro Konno; Akira Takahashi; Atsushi Mine, all of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,455

(22) Filed: Jan. 25, 1999

(30) Foreign Application Priority Data

Jan. 29, 1998 (JP) .................................................. 10-017429

(51) Int. Cl.[7] .................................................. G06F 165/00
(52) U.S. Cl. ............................ 701/209; 701/23; 701/208; 701/214; 340/988; 73/178 R
(58) Field of Search .............................. 701/23, 200, 208, 701/209, 210, 211, 214; 340/988, 990, 995; 73/178 R

(56) References Cited

U.S. PATENT DOCUMENTS

| 5,220,507 | * | 6/1993 | Kirson | 701/202 |
| 5,608,635 | * | 3/1997 | Tamai | 701/209 |
| 5,661,650 | | 8/1997 | Sekine | 364/424.027 |
| 5,774,073 | * | 6/1998 | Maekawa et al. | 340/995 |
| 6,034,626 | * | 3/2000 | Maekawa et al. | 701/210 |

FOREIGN PATENT DOCUMENTS

| 0645603 | 3/1995 | (EP) . |
| 0703436 | 3/1996 | (EP) . |
| 0789225 | 8/1997 | (EP) . |
| 0790486 | 8/1997 | (EP) . |
| 8-194886 | 7/1996 | (JP) . |

\* cited by examiner

Primary Examiner—William A. Cuchlinski, Jr.
Assistant Examiner—Gertrude Arthur
(74) Attorney, Agent, or Firm—Smith, Gambrell & Russell, LLP

(57) ABSTRACT

The present invention provides a route consideration apparatus which can reduce amount of road geometry data to a necessary and sufficient volume to be managed, foreseeing probable routes by selecting branch roads appropriately.

The route assessor 5 designates three route at maximum, i.e., the first prior route to the third prior route, according to the data inputted from the navigator. The curve geometry detector 6 detects rode geometry according to inputted data from the navigator 3.

Thus previewing of route to be traveled can be carried out effectively and the vehicle dynamic control system works well with the previewing function.

12 Claims, 8 Drawing Sheets

FIG. 7
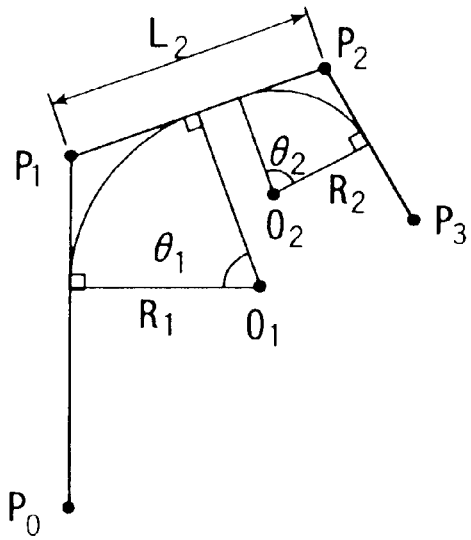
(a) CASE1
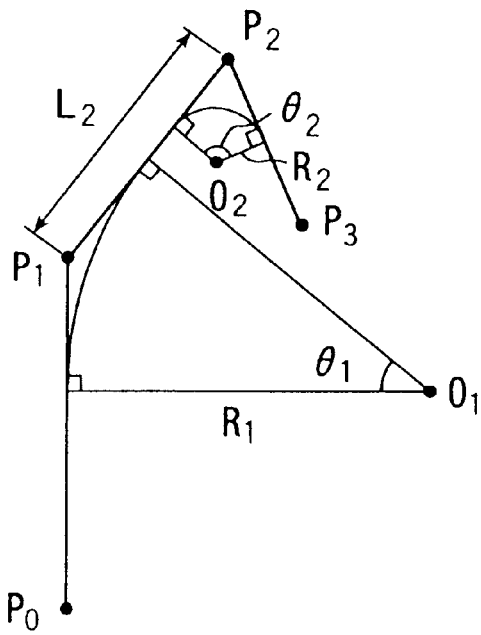
(b) CASE2
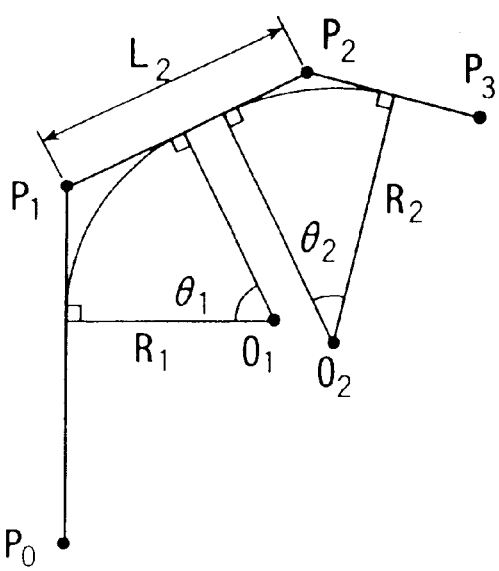
(c) CASE3
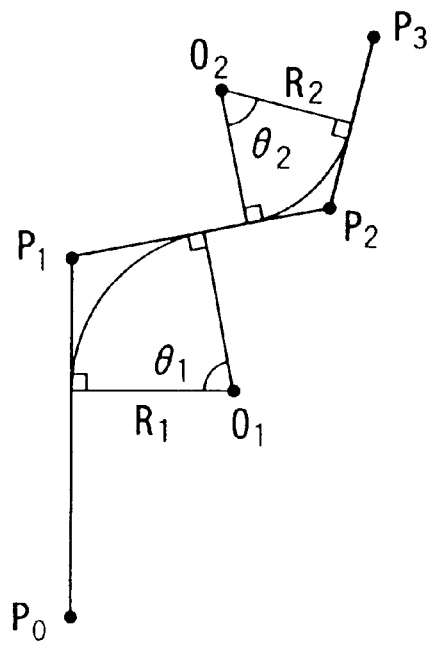
(d) CASE4

ROUTE CONSIDERATION APPARATUS

BACKGROUND OF THE INVENTION

This invention relates to a route consideration apparatus selecting a plurality of probable routes where the vehicle is possibly to run and recognizing road geometry of the probable routes.

Currently, such navigators as having the following functions are practically used. Once a destination is designated by the driver, the navigator determines the shortest distance route and the shortest time route after calculations and shows those routes on the map in the display, while changing them depending on running of the vehicle and guiding the driver to those routes by outputting warnings.

Recently presented many times are such technologies as disclosed by the Japanese Patent Laid-open No. 194866/1996 for example, where a route consideration apparatus takes in the guided route inputted by the navigator, assigns it as the running route, and considers road geometry along with the running route (i.e., guided route) according to vehicle position and map data determined by or inputted from the navigator, then warnings are dispatched and vehicle speed is controlled in response to vehicle running conditions considering the recognized road geometry.

According to the prior arts aforementioned, road geometry is not considered in the cases that a guided route is not determined because the driver does not designate any destination or the vehicle is driven not along the guided route. Thus it becomes impossible to output warning against speed and control vehicle speed in response to road geometry in the front.

It can be thought that a route consideration apparatus considers all roads within a range in the front as probable routes and recognizes all their geometry, without taking in the guided route inputted from the navigator.

However, data quantity are too much for a route consideration apparatus to grasp geometry of all roads in the front and their branch roads because of the fact that a road, in general, has many intersections and branch roads. Thus, such an idea is impracticable.

SUMMARY OF THE INVENTION

The present invention provides a route consideration apparatus which can take in probable routes appropriately without doing complicated calculations even if branch roads exist in the front and can recognize road geometry of probable routes.

In order to achieve the aforementioned object, the route consideration apparatus according to the present invention is furnished with a route assessment means for selecting a plurality of routes within a predetermined range based on road data inputted from a navigator while assigning priorities. An ongoing road is designated to the first prior route. Assessment of running probability is done on each branch road so that a branch road having the first highest probability is designated to the first prior route extension when there exists the next intersection within the predetermined range on the ongoing road. The respective branch roads having the second highest and after probabilities are designated to the second and after prior routes according to probability ranking within a predetermined number of designations.

Furthermore, the route consideration apparatus comprises a curve geometry detecting means for detecting curve geometry based on the road data of the respective prior routes designated by the route assessment means.

Furthermore, the number of the respective prior routes designated by the route assessment means is more than and equal to three.

Furthermore, the route assessment means utilizes at least one of the following information acquired from the navigator, when assigning priorities of running probabilities to the respective branch roads; a guided route to a destination, road kinds, road widths and flexion directions of the respective branch roads against the ongoing road.

Furthermore, the route assessment means determines the priorities on the respective branch roads with the following steps; assigning the highest running probability and priority to the guided route to a destination if any, assigning the following running probabilities and priorities by the road kinds to other branch roads except the guided route, assigning ensued running probabilities and priorities by the road widths to branch roads, to which the same priority has been assigned by the road kinds, and assigning ensued running probabilities and priorities by the flexions to branch roads, to which the same priority has been assigned by the road widths.

BRIEF DESCRIPTION OF DRAWINGS

FIGS. 7(a) to (d) are illustrations showing four cases at data reduction section;

DETAILED DESCRIPTION OF PREFERRED EMBODIMENTS

Preferred embodiment of the present invention is described according to the accompanied drawings. Drawings FIG. 1 through FIG. 8 show an embodiment of the present invention.

Figure 1:
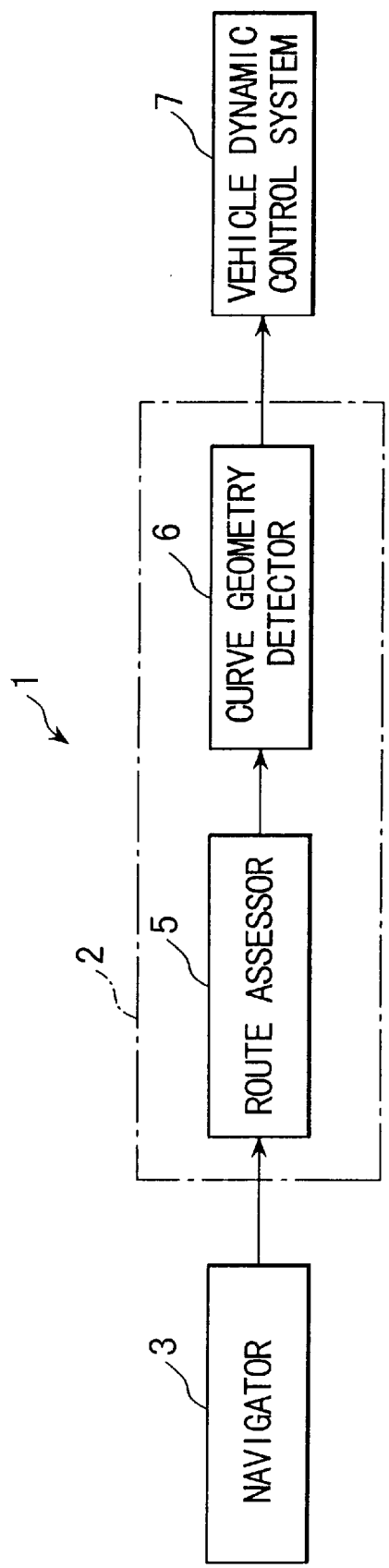
FIG. 1 is a block diagram showing a whole configuration of a route consideration apparatus.

Referring to FIG. 1, cardinal number 1 means total construction of the route consideration apparatus. Main part of the route consideration apparatus 1 comprises a controller 2 and the navigator 3 connected to the controller 2. Data representing probable routes, i.e., road geometry recognized by the route consideration apparatus 1 are outputted to a vehicle dynamic control system 7 which carries out, for example, deceleration control or dispatching warnings against an emerging curve in the route as necessary.

Figure 2:
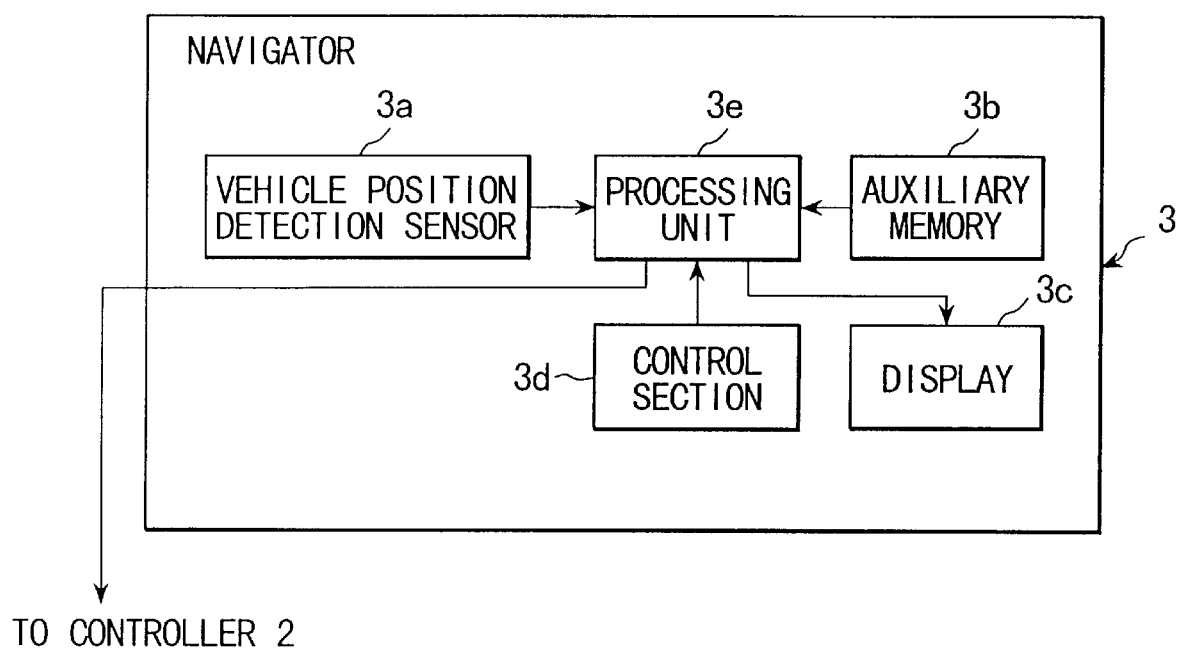
FIG. 2 is an illustration showing construction of navigator.

In general, as shown in FIG. 2, the navigator 3 consists mainly of a vehicle position detection sensor 3a, an auxiliary memory 3b, a display 3c, a control section 3d, and a processing unit 3e.

The vehicle position detection sensor 3a gathers running information related to vehicle position. The sensor 3a consists manly of a GPS(Global Positioning System) receiver to receive positioning signals from GPS satellites so as to determine the position of the vehicle; a geomagnetic sensor to detect the absolute running direction of the vehicle; and an electromagnetic pickup fixed on the vehicle and so arranged as to face with an outer periphery of a rotor, the electromagnetic pickup being connected to a wheel speed sensor outputting a pulse signal when it crosses projections on the outer periphery of the rotor.

Figure 6:
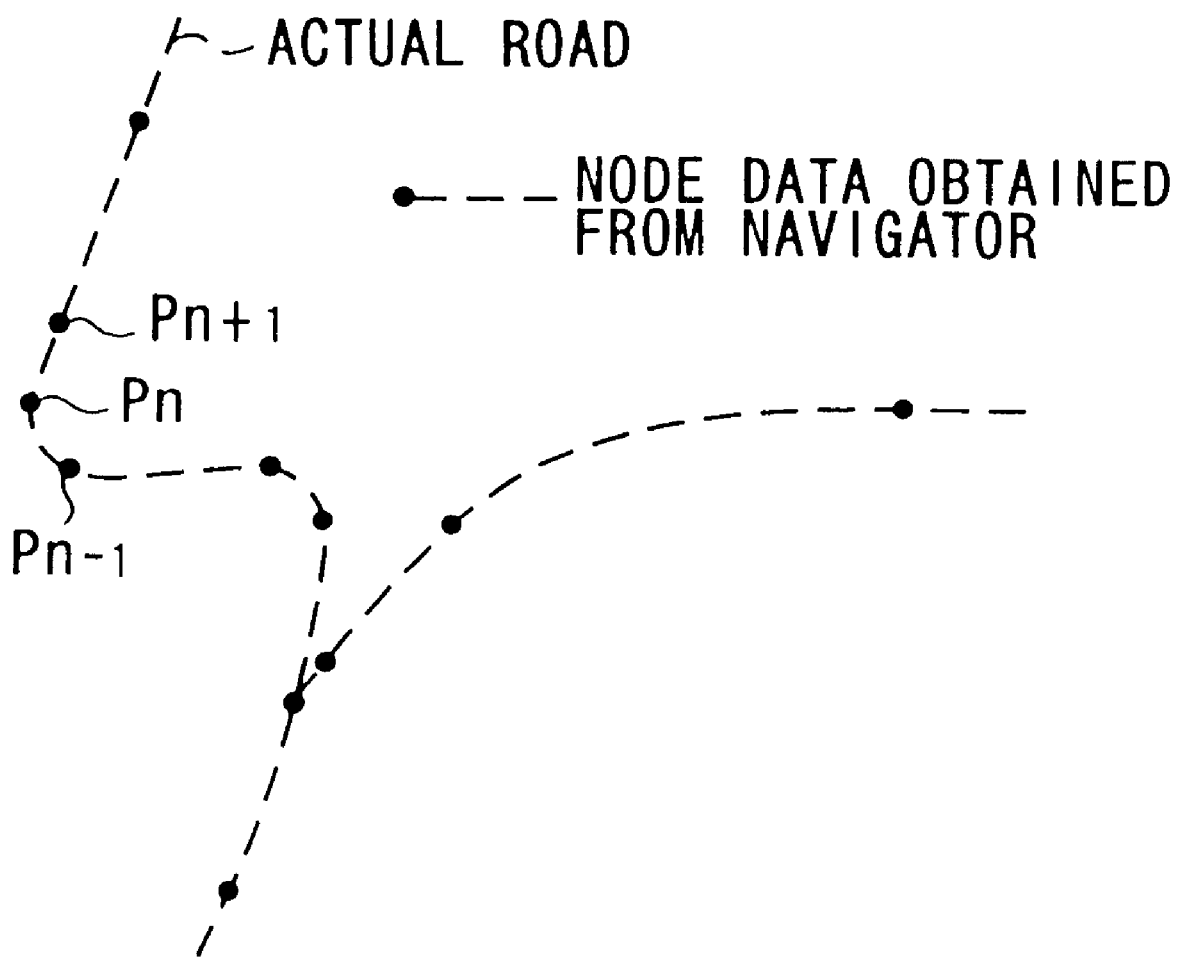
FIG. 6 is an illustration showing examples of node data actually obtained from a navigator.

The auxiliary memory 3 is a CD-ROM device, loading a CD-ROM storing road map information including road data and topographical data. The CD-ROM stores road map information in a plurality of hierarchical levels in various scales and further stores road kind information such as motor ways, ordinary national roads and local roads, passage conditions such as road widths and intersections. As shown in FIG. 6, the road data included in the road map information consist of node data with given intervals.

The display 3c is a liquid crystal display which displays maps, the vehicle position (latitude, longitude and altitude), direction, the position of vehicle on the map, and the optimum routing up to a destination. A touch panel, the control section 3d is integrated in the display 3c (liquid crystal display) to provide control functions such as map scale change and display switching for detailed place name display, area information display and route guidance display.

The processing unit 3e composes the vehicle running information inputted from the vehicle position detection sensor 3a and the road map information registered from the auxiliary memory 3b, while making map matching and other processing. The results are sent to the display 3c following to an operating signal sent from the control section 3d, so as to display the present position of the vehicle, a map of the neighborhood, an optimum route to destination and other information.

Data obtained from the vehicle position detection sensor 3a, the auxiliary memory 3b and the processing unit 3c are outputted to the controller 2.

The controller 2 mainly consists of a route assessor 5 and a curve geometry detector 6.

The route assessor 5 is provided as an route assessment means to which the navigator 3 outputs the road map information, other data detected and an optimum route to a destination when designated by the driver. As to the inputted data of road map information and so on mentioned herewith, they are picked up out of data stored in the auxiliary memory 3b, e.g. data covering an area in a range of 300 meters from the vehicle.

The route assessor 5 carries out calculations based on respective inputted data. In the case that there exist intersections on the ongoing (current) road in the predetermined range resulting in existing of probable routes, the route assessor 5 assigns priorities to respective branch roads, designates branch roads having higher running probabilities to prior routes, which are the $1^{st}$ (first) through the $3^{rd}$ (third) prior routes, and then outputs data only for these prior routes to the curve geometry detector 6 out of data inputted from the navigator 3. As for the selection of these prior routes, a number of routes may be 2(two), 4(four) or more, though this embodiment of the present invention shows selection of 3(three) routs, the $1^{st}$ (first) though the $3^{rd}$ (third) prior routes.

The following shows how the route assessor 5 determines the priorities on branch roads of the ongoing road for the selection.

(1) In the case the driver does not designate any destination;

The route assessor 5 firstly assigns priorities by road kinds to respective branch roads of the ongoing road. If some of the branch roads are assigned with same priority by road kinds, following priorities are assigned road widths. And if some of the branch roads are assigned with same priority by both of road kinds and road widths, ensued priorities are assigned by flexion (curvature) directions of the branch roads against the currently running direction of the vehicle.

The road kinds are sorted into 9 classes, i.e., national motor way, local motor way, national main road, provincial main road, local main road, provincial road, local road, other road and not assessed road in order from higher priority.

A wider road has a higher priority.

Priorities by flexion is given to straight, left turn and right turn in order. The reason why the left turn has a higher priority than the right turn is that a warning or a vehicle movement control is apt to be carried out in left turn because of its smaller turning radius.

The route assessor 5 designates the ongoing road to the $1^{st}$ (first) prior route without selecting the $2^{nd}$ (second) and $3^{rd}$ (third) prior routes, when no intersection exists in the predetermined range.

If the route assessor 5 is able to select only the $1^{st}$ (first) and $2^{nd}$ (second) routes in the next intersection, i.e. the next intersection is a junction of three roads, the $3^{rd}$ (third) prior route is designated on a branch road at the ensued intersection on the $1^{st}$ (first) prior route.

(2) In the case the driver designate a destination;

The route assessor 5 selects an optimum route to the destination determined by the navigator 3 among branch roads of the ongoing road. And designates it to the $1^{st}$ (first) prior route. Priorities of the other branch roads are determined by the same operations employed in the case that the driver does not designate any destination.

Thus the route assessor 5 is able to select probable routes, which have high running probabilities of the vehicle, and does not output road data for the other routes having low running probabilities to the curve geometry detector 6 so as not to carry out unnecessary calculations in the curve geometry detector 6.

The route assessor 5 designates not only the $1^{st}$ (first) prior route on the route having the highest running probability of the vehicle, but also designate the $2^{nd}$ (second) and $3^{rd}$ (third) prior routs on the routes having ensued running probabilities, providing a capability to prevent the designation of prior routes from some omissions with very low risk even with small number of prior routes.

If the route assessor 5 is able to select only the $1^{st}$ (first) and $2^{nd}$ (second) routes, the route assessor 5 recognizes that the next intersection is a junction of three roads, possibly T shape junction.

The navigator 3 provides node data showing roads in road map information, road width data and road kind data, i.e., motor way, national road, local road and so on to the route assessor 5. The road assessor 5 provides the curve geometry detector 6 with only the data which relate to the routes designated by the road assessor 5 among them. The curve geometry detector 6 is a curve geometry detecting means for detecting curve configuration based on the data inputted from the road assessor 5.

Figure 3:
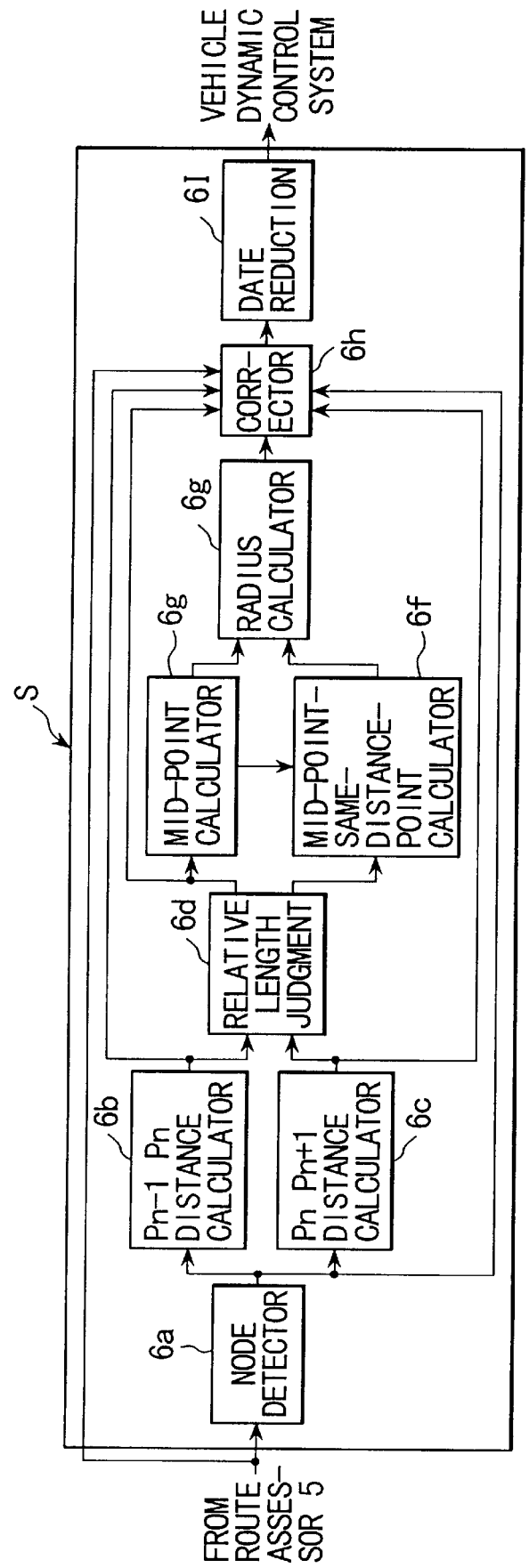
FIG. 3 is an illustration showing a curve geometry detector.
Figure 4:
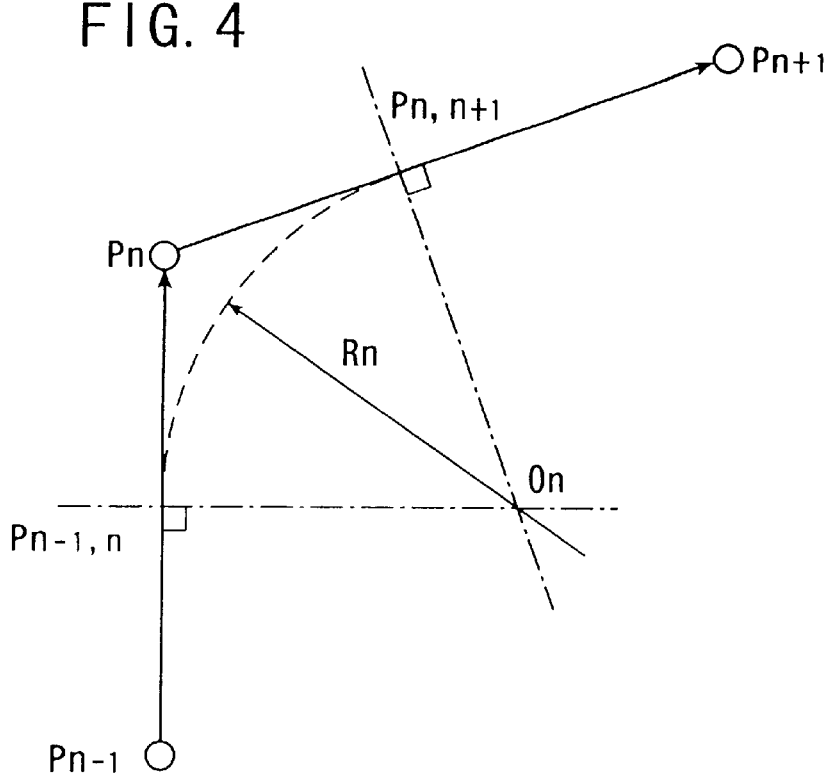
FIG. 4 is an illustration showing how to determine the radius of curvature of a curve.

As shown in FIG. 3, the curve geometly detector 6 comprises a node detector 6a, a Pn−1 Pn distance calculator 6b, a Pn Pn+1 distance calculator 6c, a relative length judgment section 6d, a mid-point calculator 6e, a mid-point-same-distance-point calculator 6f, a radius calculator 6g, a corrector 6h and a data reduction 6i.

As shown in FIG. 7, out of the node data inputted from the route assessor 5, the node detector 6a registers three consecutive nodes in the traveling direction of the vehicle or on the road selected by the driver, and names them the $1^{st}$ (first) node Pn−1, the $2^{nd}$ (second) node Pn and the $3^{rd}$ (third) node Pn+1, in turn from the closest. From the registered three nodes, the positional information of the $1^{st}$ (first) and $2^{nd}$ (second) nodes, Pn−1 and Pn are outputted to the Pn−1 Pn distance calculator 6b, and the positional information of the $2^{nd}$ (second) and $3^{rd}$ (third) nodes, Pn and Pn+1 are outputted to the Pn Pn+1 distance calculator 6c. Positional data of Pn−1, Pn, and Pn+1 are (Xn−1, Yn−1), (Xn,Yn), and (Xn+1, Yn+1), respectively, Pn is the representative node of them. The curve data at points P1, P2, . . . , and Pn are calculated by the node combinations of (P0, P1, P2), (P1, P2, P3), . . . , and (Pn−1, Pn, Pn+1), respectively.

The Pn−1 Pn distance calculator 6b calculates a straight distance from Pn−1 to Pn according to the positional information of Pn−1 and Pn inputted from the node detector 6a, and sends the distance datum to the relative length judgment 6d and the corrector 6h.

The Pn Pn+1 distance calculator 6c calculates a straight distance from Pn to Pn+1 according to the positional information of Pn and Pn+1 inputted from the node detector 6a, and sends the distance datum to the relative length judgment 6d and the corrector 6h.

The relative length judgment 6d compares the straight distance from Pn−1 to Pn inputted from the Pn−1 Pn distance calculator 6b and the straight distance from Pn to Pn+1 inputted from the Pn Pn+1 distance calculator 6c, so as to judge relative length. Data (position, distance) of the shorter straight distance are sent to the mid-point calculator 6e and the corrector 6h, while data (position, distance) of the longer straight distance are sent to the mid-point-same-distance-point calculator 6f.

When the comparison at the relative length judgment 6d shows an equal length for the both straight distances, either one can be used. It is set that the straight line connecting Pn−1 and Pn is regarded as the shorter straight line in this case. (It may be set that the straight line connecting Pn and Pn+1 is regarded as the shorter straight line).

An explanation will follow for the case the straight line connecting Pn−1 Pn is shorter than the straight line connecting Pn and Pn+1.

According to the data (position, distance) of the shorter straight line inputted from the relative length judgment 6d, the mid-point calculator 6e calculates half of the shorter straight distance and determines the mid point position on the shorter straight line. Here, the mid point of the shorter straight line connecting Pn−1 and Pn is named Pn−1, n of which coordinates are represented by (Xn−1, n, Yn−1, n).

Pn−1, n=(Xn−1, n, Yn−1, n) =((Xn−1+Xn)/2, (Yn−1+Yn)/2)

And the data calculated by the mid-point calculator 6e are sent to the mid-point-same-distance-point calculator 6f and the radius calculator 6g.

According to the data (position, distance) of the longer straight line inputted from the relative length judgment 6d and the half of the shorter straight line distance inputted from the mid-point calculator 6e, the mid-point-same-distance-point calculator 6f determines a mid-point-same-distance-point on the longer straight line at the position in half the distance of the shorter straight line from the $2^{nd}$ node Pn. Here, the mid-point-same-distance-point of the longer straight line connecting Pn and Pn+1 is named Pn,n+1, of which coordinates are represented by (Xn,n+1, Yn,n+1).

Pn,n+1=Pn+Pn Pn,n+1

=(Xn,Yn)+K2(Xn+1−Xn, Yn+1−Yn)

=(Xn,n+1, Yn,n+1)

where, $$K2=((Xn-Xn-1)^2+(Xn-Yn-1)^2)^{1/2}/(2((Xn+1-Xn)^2+(Yn+1-Yn)^2)^{1/2})$$

The positional data of the mid-point-same-distance-point Pn,n+1 calculated by the mid-point-same-distance-point calculator 6f are sent to the radius calculator 6g.

According to the positional data of the mid-point Pn−1, n inputted from the mid point calculator 6e and the positional data of a mid-point-same-distance-point Pn,n+1 calculated by the mid-point-same-distance-point calculator 6f, the radius calculator 6g determines the center "On" of the emerging curve on the road by creating the crossing point of a line that lies at right angle to the shorter straight line (here, Pn−1 Pn) at the mid-point Pn−1, n and a line that lies at the right angle to the longer straight line (here, Pn Pn+1) at the mid-point-same-distance-point Pn,n+1. Then, the radius calculator 6g calculates the radius of curvature Rn of the curve based on the determined center "On". The calculation results are sent to the corrector 6h. I.e., $$On = Pn-1, n + Pn-1, n \; On \qquad (1)$$
$$= (Xn-1, n, Yn-1, n) + M(Yn-Yn-1, Xn-1-Xn)$$

$$On = Pn, n+1 + Pn, n+1 \; On \qquad (2)$$
$$= (Xn, n+1, Yn, n+1) + N(Yn+1-Yn, Xn-Xn+1)$$

Therefore, $$Xn-1, n+M(Yn-Yn-1)=Xn,n+1+N(Yn+1-Yn) \qquad (3)$$

$$Yn-1, n+M(Xn-1-Xn)=Yn,n+1+N(Xn-Xn+1) \qquad (4)$$

Elimination of M from both formulas (3) and (4) can obtain N as shown below:

$$N=((Xn-1-Xn)(Xn-1, n-Xn,n+1)+(Yn-1-Yn)(Yn-1, n-Yn,n+1))/ (Xn-1\cdot Yn+1-Xn+1\cdot Yn-1-Xn-1\cdot Yn+Xn\cdot Yn-1-Xn\cdot Yn+1+Xn+1\cdot Yn) \qquad (5)$$

The position "On" of curve center is:

$$On = (Xon, Yon) \qquad (6)$$
$$= (Xn, n+1 + N \cdot Yn + 1 - N \cdot Yn,$$
$$Yn, n+1 + N \cdot Xn - N \cdot Xn + 1)$$

Therefore, the radius of curvature Rn is obtained from the following formula:

$$Rn=((Xn-Xn-1)(Yn+1-Yn)-(Xn+1-Xn)(Yn-Yn-1))/|((Xn-Xn-1)(Yn+1-Yn)-(Xn+1-Xn)(Yn-Yn-1))|\cdot((Xon-Xn-1,n)^2+(Yon-Yn-1,n)^2)^{1/2} \qquad (7)$$

Here, a positive figure of radius of curvature Rn means a left turn and a negative figure means a right turn.

The distance Lon from the curve center On to the representative node of the curve, i.e., the $2^{nd}$ node Pn is obtained from the following formula (7):

$$Lon=((Xon-Xn)^2+(Yon-Yn)^2)^{1/2} \qquad (7)$$

The corrector 6h calculates the difference Deln between the radius of curvature Rn obtained by the radius calculator 6g and the distance Lon from the curve center On to the $2^{nd}$ node Pn. When the difference Deln exceeds a given error value (to be mentioned later), the corrector 6h corrects the radius of curvature Rn so that the difference Deln be within the given error value.

Final curve data for each representative node Pn, which has been corrected by the corrector 6h or left intact because of the difference Deln being smaller than the given error value, are stored and sent to the data reduction 6i. Here, the final curve data for each representative node Pn include the position(Xn,Yn) of the representative node Pn; a distance Ln between node Pn−1 and node Pn; the final radius of curvature Rn; a curve angle θn obtained from an angle formed by lines Pn−1 Pn and Pn Pn+1; a distance between the curve starting point Lsn (the intersection point of the line Pn−1 Pn and the perpendicular from the curve center On to the line Pn−1 Pn) and the Pn−1; and a distance Lssn from vehicle position to each representative node Pn.

The given error value depends on a road width D and the shorter straight line distance, thereby being represented as αD. (Here, α is a constant to be set in accordance with the shorter straight line distance, hereinafter referred to as a node interval correction factor.) The road with D is the wider, the bigger the given error value is, resulting in less possibility of correction. That is to represent a reality that a road with is the wider, the bigger a radius of curvature is.

As with the node interval correction factor α, the shorter straight line distance is the shorter, the larger the node interval correction factor α is, resulting in less possibility of correction. For example, when the shorter straight line distance is shorter than 20 m, α is 1.2, when the shorter straight line distance is middle namely shorter than 100 m, α is 0.6, and when the shorter line distance is longer than 100 m, α is 0.3. Short intervals of nodes represent that the road is accurately drawn by nodes on the map, i.e., less correction is necessary.

Figure 5:
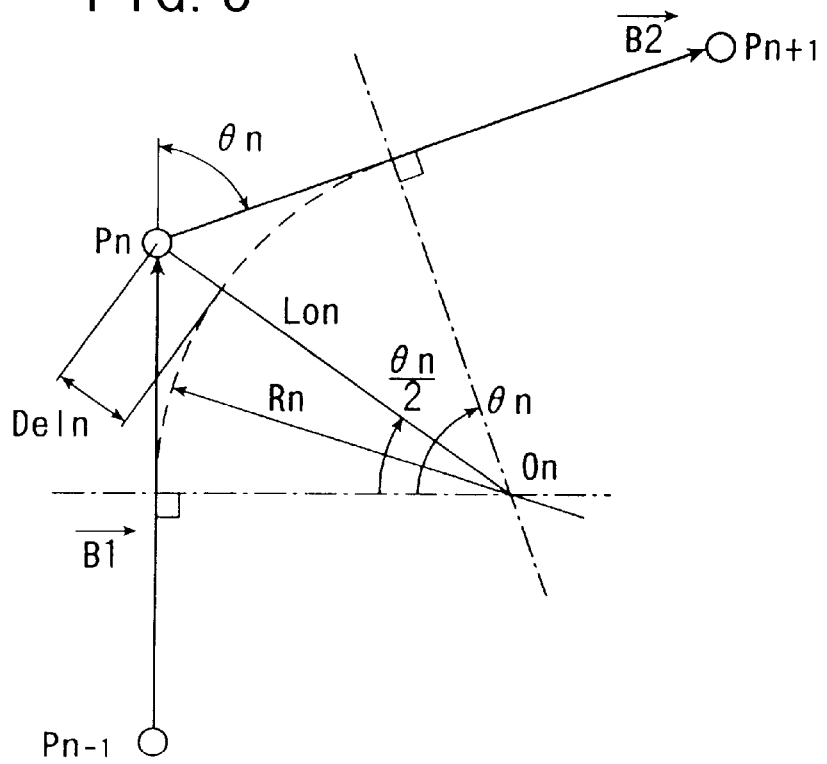
FIG. 5 is an illustration showing how to correct the obtained radius of curvature of a curve.

FIG. 5 shows a detailed correction to be made by the corrector 6h. The vector from Pn−1 to Pn is denoted by B1, and the vector from Pn to Pn+1 is denoted by B2.

$$B1=(Xn-Xn-1, Yn-Yn-1)=(Xb1,Yb1),$$

$$B2=(Xn+1-Xn, Xn+1-Yn)=(Xb2,Yb2)$$

An angle θn formed by B1 and B2 is as follows:

$$\cos\theta n=(Xb1\cdot Xb2+Yb1+Yb2)/(|B1|\cdot|B2|)$$

The error(ratio) Pdeln between Lon and Rn is as follows:

$$Pdeln = Rn/Lon \quad (9)$$
$$= \cos(\theta n/2) = ((\cos\theta n + 1)/2)^{1/2}$$

Therefore, the difference Deln between Lon and Rn is as follows:

$$Deln = Lon - |Rn| = Lon \cdot (1 - Pdeln) \quad (10)$$
$$= Lon(1 - (\cos\theta n + 1)/2)^{1/2})$$

In this connection, when the difference Deln exceeds the given error value(αD), the radius of curvature Rn is corrected so that Deln becomes equal to αD. I.e., $$Lon = Deln/(1 = ((\cos\theta n + 1)/2)^{1/2}) \quad (11)$$
$$= \alpha D/(1 - ((\cos\theta n + 1)/2)^{1/2})$$
$$= \alpha D/(1 - ((Xb1\cdot Xb2 + Yb1\cdot Yb2 + |B1|\cdot|B2|)/$$
$$(2|B1|\cdot|B2|))^{1/2})$$

$$Rn = Lon \cdot Pdeln$$
$$= \alpha D/(1 - ((\cos\theta n + 1)/2)^{1/2}) \cdot ((\cos\theta n + 1)/2)^{1/2}$$
$$= \alpha D/((2/(\cos n + 1))^{1/2} - 1)$$
$$= \alpha/D((2|B1ve|\cdot|B2ve|/$$
$$(Xb1\cdot Xb2 + Yb1\cdot Yb2 + |B1ve|\cdot|B1ve|\cdot|B2ve|))^{1/2}$$

Since curve information is obtained from the curve geometry detector 6 as described above, data of the nodes with irregular intervals can be used as they are. Thus the radius of curvature of a road being traveled on can be determined quickly and accurately by simple calculation without data supplement or complex calculations.

The continuity of radiuses of curvature determined for respective nodes are natural and the obtained data represent accurately an actual load geometry.

Further, when possible calculation errors occur, the calculated radius of curvature always becomes smaller than the actual radius of curvature. This is preferable for a warning/deceleration control to make a proper warning when approaching a curve.

With provision of the corrector 6h for the radius of curvature, it is possible to calculate the radius of curvature accurately. Furthermore, provision that makes the given error value variable depending on actual road widths and node intervals can make calculations more accurate. In other words, in order to represent a reality that a road with is the wider, the bigger a radius of curvature is, it is so set that the road with D is the wider, the bigger the given error value is, resulting in less possibility of correction. In order to reflect a fact that short intervals of nodes represent that the road is accurately drawn by nodes on the map, it is so set that the shorter straight line distance is the shorter, the larger the node interval correction factor α is, resulting in less possibility of correction.

The data reduction 6i is provided to reduce data of road information for respective nodes detected by the curve geometry detector 6. As the vehicle dynamic control system registers the reduced data and carries out calculations, the data reduction mentioned above is provided to eliminate unnecessary calculations.

There is a case where the navigator 3 represents a curve by several nodes. Also there is a case where a controlling is carried out for one curve then the same controlling can be continued for another curve.

In order to reduce node data, the data reduction 6i assumes the following four cases in which respective nodes are sorted considering relation of Pn to Pn−1.

CASE 1—Curve becomes sharp, but there is an enough distance (=Rn−1−Rn) to decelerate before reaching node Pn from node Pn−1 (FIG. 7(a)).

If|Rn−1|>|Rn|, Rn−1·Rn>0 and Ln<|Rn−1|−|Rn| then the curve information for both nodes Pn−1 and Pn is necessary, because here is an enough distance for deceleration before the vehicle reaches node Pn from node Pn−1 and independent control may be necessary for each node.

Considering that node Pn−1 and node Pn both represent one curve, a total curve angle exist. To determine the total curve angle up to node Pn, θn at node Pn is added. θsn denotes the total curve angle up to Pn.

θsn (total curve angle up to node Pn)=θs(n−1) (total curve angle up to node Pn−1)+2cos$^{-1}$(Rn/Lon).

CASE 2—Curve becomes sharp, and there is not an enough distance(=Rn−1−Rn) to decelerate before reaching node Pn from node Pn−1 (FIG. 7(b)).

If|Rn−1|>|Rn|, Rn−1·Rn>0 and Ln<|Rn−1|−|Rn|, then the curve information of node Pn−1 is neglected. The execution of control for a curve of node Pn absorbs the control for a curve of node Pn−1, resulting in the curve information of node Pn−1 being useless a nd neglected.

Considering that node Pn−1 and node Pn both represent one curve, a total curve angle exist. To determine the total curve angle up to node Pn, θn at node Pn is added. θsn denotes the total curve angle up to Pn.

θsn (total curve angle up to node Pn)=θs(n−1) (total curve angle up to node Pn−1)+2 cos$^{-1}$(Rn/Lon).

CASE 3—Curve becomes mild (FIG. 7(c)).

If|Rn−1|<|Rn|, Rn−1·Rn>0, then the curve information of node Pn is neglected. Since the vehicle is sufficiently decelerated at the node Pn−1, the curve information of the node Pn which represents a milder curve than that of the node Pn−1 is useless and neglected. In this connection, in the case of long Ln, full acceleration (if node Pn−1 and node Pn can be regarded as independent curves) may boost the vehicle speed a great deal before the vehicle reaches node Pn, so that the curve information for node Pn may be maintained depending on the magnitude of Ln.

Considering that node Pn−1 and node Pn both represent one curve, a total curve angle exist. To determine the total curve angle up to node Pn, θn at node Pn is added. θsn denotes the total curve angle up to Pn.

θsn (total curve angle up to node Pn)=θs(n−1) (total curve angle up to node Pn−1)+2 cos$^{-1}$(Rn/Lon).

In this connection, if the curves at node Pn−1 and node Pn are regarded as independent from each other, the curve angle θn at the node Pn is not added, but a new addition calculation will start. (depending on the magnitude of Ln).

CASE 4—The turning direction changes from right to left or from left to right (FIG. 7(d)).

If Rn−1·Rn<0, then, the curve information for node Pn is needed. Since turning direction changes when the vehicle runs from node Pn−1 to node Pn, data reduction here is not carried out.

θs(n−1) denotes the total curve angle up to node Pn−1 as a result of continual addition curve angles up to node Pn−1.

Curve angle addition is started from node Pn to obtain a total curve angle θsn.

θsn (the total curve angle up to node Pn)=2 cos$^{-1}$(Rn/Lon) Sorting into each of the 4 cases, when a node falls in two contradictory conditions, i.e., necessary and unnecessary, the node is neglected.

The road geometry data obtained in such manner as above are sent to, for example, the vehicle dynamic control system 7 which carries out a deceleration control and warning control as necessary against an emerging curve on the on the ongoing road.

Figure 8:
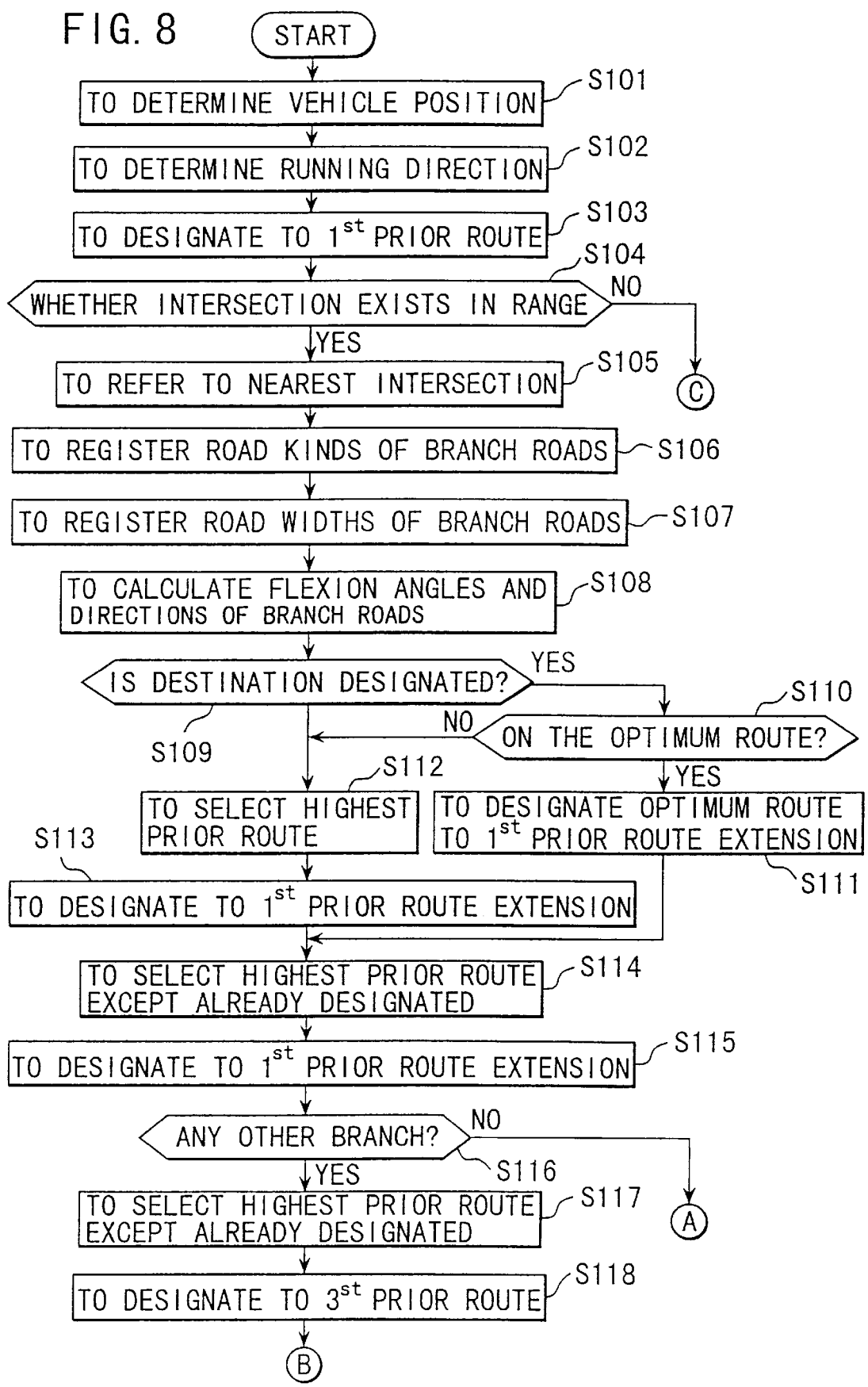
FIG. 8 is a flow chart showing route assessment.
Figure 9:
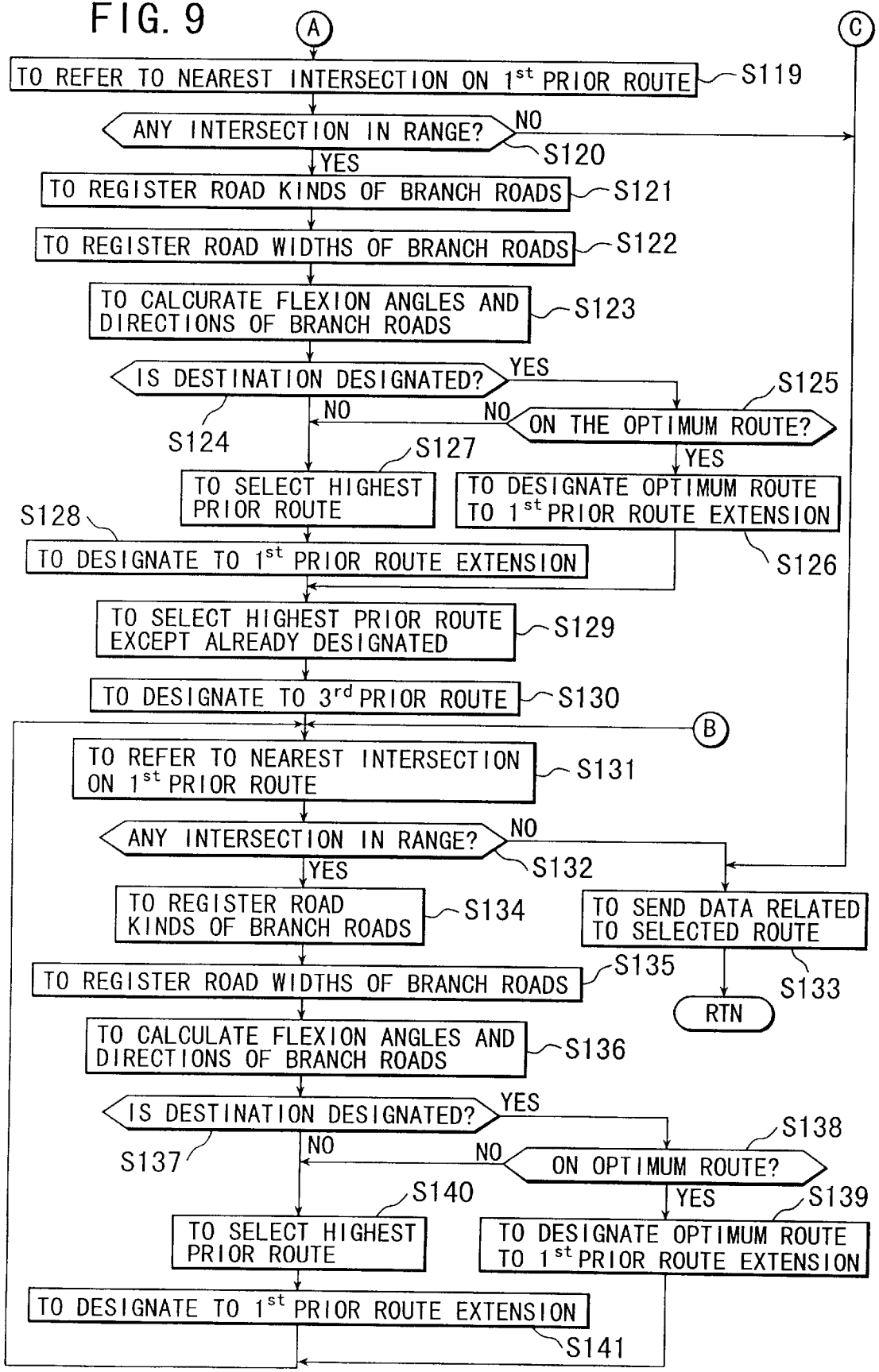
FIG. 9 is a flow chart showing route assessment (continued from FIG. 9).

Operations carried out by the route assessor 5 are to be explained, referring to route assessing flow charts shown in FIG. 8 and FIG. 9. This program is to select three possible routes at maximum, i.e., the first prior route through the third prior route out of roads in a predetermined range. When there are intersections in the predetermined range, the selection of possible routes is carried out at first at the nearest intersection from the vehicle and continued at the next one and after. The program is carried out repeatedly at a predetermined interval. When the program starts, inputted from the navigator 3 are road map information within a predetermined range, e.g., 300 m, data detected and the optimum route if any destination has been designated by the driver. At Step 101, hereinafter abbreviated to S101, the vehicle's own position on the road map information, hereinafter abbreviated to road, is determined based on position data inputted from the navigator 3. Then the program goes to S102.

At S102, running direction on the road map is determined based on the real direction inputted from the navigator 3. Then goes to S103.

At S103, the route going on the running direction on the road map, i.e., the ongoing road, is designated to the 1$^{st}$ (first) prior route. Then goes to S104. If any intersection exists within a predetermined range, the route from the vehicle's own position to the next intersection is designated as the 1$^{st}$ (first) prior route at S103.

At S104, it is judged whether any intersection exists within a predetermined range on the roadmap or not, i.e., within a predetermined real range on the ongoing road. If not, goes to S133. If yes, goes to S105.

At S133, data which are related to the selected route and inputted from the navigator 3, are outputted to the curve geometry detector and then goes out the routine.

At S105 resulting from the judgment of some intersections within the predetermined range at S104, the nearest intersection is referred to. At S106, road kinds of the respective branch roads from the intersection are registered. At S107, road widths of the respective branch roads are registered. At S108, flexion angles and directions of the respective branch roads against the ongoing road are calculated. Then goes to S109.

At S109, it is judged whether any destination is designated or not. If yes, goes to S110. If not, goes to S112.

At S110 resulting from the judgment of some destination designated at S109, it is judged whether the ongoing road is in line with an optimum route selected by the navigator 3 or not. If yes, goes to S111. If not, goes to S112.

At S111, out of the branch roads, one branch road which is in line with the optimum rotes is selected and designated to the 1$^{st}$ (first) prior route extension, i.e., the ongoing road extension. Then goes to S114.

At S112 resulting from the judgment of no destination designated at S109 or the judgment of running not on the optimum route at S110, the highest prior route is selected out of the branch roads referring to road kinds, road widths and flexion directions in the predetermined manner. Then goes to S113. At S113, the branch road selected at S112 is designated to the 1$^{st}$ (first 9 prior route extension, i.e., the ongoing road extension. Then goes to S114.

At S114, out of the branch roads at the nearest intersection except the 1$^{st}$ (first) prior route, the highest prior route is selected. The goes to S115. At S115, the branch road selected at S114 is designated to the 2$^{nd}$ (second) prior route. Then goes to S116. Registering of road distance of the 2$^{nd}$ (second) prior route, i.e., a distance of a part of the branch road starting from the intersection, is limited to a predetermined short range, in order to reduce data volume.

At S116, it is judged whether there is any branch road remained except ones designated to the $1^{st}$ (first) and $2^{nd}$ (second) prior routes. If yes, goes to S117. If not, goes to S119.

In the case that it has been judged that there is not any branch road at S116, the nearest intersection is judged as a junction of three roads. It is considered that the ongoing road comes to an end with a high possibility at the intersection, i.e. a T shape junction.

At S117 resulting from the judgment of some branch roads found at S116, one branch road with the highest priority is selected except the $1^{st}$ (first) and $2^{nd}$ (second) prior routes. Then goes to S118. At S118, the branch road selected at S117 is designated to the $3^{rd}$ (third) prior route. Then goes to S133. Registering of road distance of the third prior route, i.e., a distance of a part of the branch road starting from the intersection, is limited to a predetermined short range, in order to reduce data volume in the same manner as carried out in the case for the $2^{nd}$ (second) prior route. In this connection, the predetermined range may be shorter than that for the $2^{nd}$ (second) prior route.

At S119 resulting from the judgment of no more branch road found at S116, it is judged whether there is any intersection in the $1^{st}$ (first) prior route after the nearest intersection. Then goes to S120.

At S120, if there is a next intersection within the predetermined range, the program proceeds to S121. And if not, the program proceeds to S133, then goes out the routine.

Proceeding from S121 through S129 are almost same as that from S106 through S114. At S121 road kinds of the respective branch roads from the intersection (the next one) are registered, at S122 road widths of the respective branch roads are registered, at S123 flexion angles and directions of the respective branch roads are calculated and then the program goes to S124.

At S124, it is judged whether any destination is designated or not by the driver. If yes, goes to S125. If not, goes to S127.

S125 resulting from the judgment of some destination designated at S124, it is judged whether the vehicle is running or not on the optimum route to the destination, determined by the navigator 3. If yes, goes to S126. If not, goes to 127.

At S126, the optimum route is selected and designated to the first prior route extension, i.e., the ongoing road extension. Then goes to S129

At S127 resulting from the judgment of no destination designated at S124 or the judgment of running not on the optimum route at S125, the highest prior route is selected out of the branch roads referring to road kinds, road widths and flexion directions in the predetermined manner. Then goes to S128. At S128, the branch road selected at S1127 is designated to the $1^{st}$ (first) prior route extension, i.e., the ongoing road extension. Then goes to S129.

At S129, the highest prior route is selected out of the branch roads at the intersection (the next intersection) except the branch road designated to the $1^{st}$ (first) prior route extension. Then goes to S130. At S130, the branch road selected at S129 is designated to the $3^{rd}$ (third) prior route. Then goes to S131.

At S131, it is judged whether a next intersection exists on the $1^{st}$ (first) prior route within the predetermined range or not. If yes, goes to S134. If not, the program goes to S133 then goes out the routine.

At S134, road kinds of the respective branch roads from the intersection are registered. Then goes to S135. At S135, road widths of the respective branch roads are registered. Then goes to S136. At S136, calculated are flexion angles and directions of the respective branch roads against the ongoing road. Then goes to S137.

At S137, it is judged whether any destination is designated or not. If yes, goes to S138. If not, goes to S140.

At S138 resulting from the judgment of some destination designated at S137, it is judged whether the vehicle is running on the optimum route determined by the navigator 3 or not. If yes, goes to S139. If not, goes to S140.

At S139, a branch road on the optimum route is selected out of the branch roads and the branch road is designated to the $1^{st}$ (first) prior route extension, i.e., of the ongoing road extension. Then returns to S131.

At S140 resulting from the judgment of no destination designated at S137 or the judgment of not on the optimum route at S138, a branch road with the highest priority is selected after assessment referring to the road kinds, road widths and flexion directions in the predetermined manner. Then goes to S141. At S141, the branch road selected at S140 is designated to of the $1^{st}$ (first) prior route extension, i.e., the ongoing road extension. Then returns to S131, Thus repeating of the steps from S131 through S141 enables to designate the $1^{st}$ (first) prior route covering all the area in the range.

According to the embodiment of the present invention, even when there are intersections and many branch roads staring from the intersections in a predetermined range in front , the route assessor 5 selects and designates the maximum three routes to the probable routes by determining priorities for the branch roads. And the route assessor sends data limited to the three routes at the maximum to the curve geometry detector 6 out of data inputted fro the navigator. Thereby, the curve geometry detector 6 can manage calculations to handle not more than the three routes having the highest probabilities without heavy burden.

The designation of the probable routes is carried out referring to road kinds, road widths and flexion directions resulting in sure assessment without complicated calculation.

When a destination is designated on the navigator 3, the optimum route to the destination is designated to the first prior route, resulting in a capability to select the most probable route as the first prior route.

When taking other branch road than that designated to the first prior route, it is possible to cope with the situation. The reason why is the second and the third prior routs, which has the next highest probabilities to the first prior route for the vehicle to run, are selected and prepared when there are a plurality of branch roads in front.

The second and third prior routes are designated in a shorter range so that amount of the data related to the second and third prior routes becomes small.

When determining priorities referring to flexion of branch roads, a priority is given to a branch road having smallest angle to ongoing straight direction first. In other words, considered is a route which need the lowest necessity of vehicle movement controls.

According to the present invention as explained above, even when there are branch roads in front, data volume to be handled can be reduced to the amount which is necessary and sufficient by surly assessing probable routes without complicated calculations.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A route consideration apparatus for a vehicle comprising:
 a navigation system for storing road map information and for determining a current vehicle position on a current road; and
 route assessment means for determining a plurality of routes that include branch roads in front of said current road;
 wherein said route assessment includes:
  branch road detecting means for detecting branch roads in front of said current road,
  priority assigning means for assigning priority to said branch roads detected by said detecting means, said priority assigning means assigning said priority to branch roads based upon at least one of a guided route to a destination provided by said navigation system, branch road type, branch road width, and branch road curvature with respect to said current road, and
  route registering means for determining said plurality of routes based upon said priority assigned to said branch roads by said priority assigning means.

2. The route consideration apparatus according to claim 1, further comprising:
 a road curvature detecting means for detecting branch road curvature based on said road map information.

3. The route consideration apparatus according to claim 2, wherein:
 said route assessment means determines at least three routes.

4. The route consideration apparatus according to claim 1, wherein:
 said route assessment means determines at least three routes.

5. The route consideration apparatus according to claim 1, wherein said priority assigning means assigns a highest priority to a branch road belonging to said guided route, and in the absence of a guided route, said priority assigning means assigns a highest priority to a branch route based upon said road type, said road width, and said road curvature.

6. The route consideration apparatus according to claim 5, wherein, among said branch road type, said branch road width, and said branch road curvature, said priority assigning means assigns priority to said branch roads such that a relatively highest priority is accorded based upon branch road type, and
 when plural branch roads are of the same type, a relatively highest priority is accorded based upon branch road width, and
 when plural branch roads are of the same width, a relatively highest priority is accorded based upon branch road curvature.

7. A route consideration apparatus for a vehicle comprising:
 a navigation system for storing map data and road information to navigate said vehicle to a destination and for determining a current vehicle position on a current road; and
 route assessment means for determining a plurality of routes that include branch roads in front of said current road;
 wherein said route assessment means includes:
  branch road detecting means for detecting a branch road in front of said current road,
  priority assigning means for assigning priorities including a highest priority and a lower priority lower than said highest priority to said branch roads detected by said branch road detecting means, and
  route registering means for calculating routes beyond said current vehicle position on said current road based upon a branch road assigned said highest priority and another branch road assigned a lower priority by said priority assigning means, said route registering means calculating routes that include said highest priority branch road for a greater distance beyond said current road than routes that include said lower priority branch road.

8. The route consideration apparatus according to claim 7 wherein:
 said road information includes at least one of a guided route to a destination, branch road types, branch road widths, and a direction of branch road curvature with respect to said current road.

9. The route consideration apparatus according to claim 7, further comprising:
 curvature detecting means for detecting road curvature in routes determined by said route assessment means based on said road information from said navigation system.

10. A route consideration method for a vehicle comprising:
 determining a current vehicle position on a current road;
 determining a running direction;
 detecting branch roads in front of said current road;
 assigning priority to detected branch roads based on at least one of a guided route to a destination, branch road types, branch road widths and branch road curvature with respect to said current road; and
 determining a plurality of routes that include said detected branch roads, based upon priority assigned to said detected branch roads during said assignment step.

11. A route consideration method according to claim 10, further comprising the steps of:
 determining the presence or absence of a guided route, and in the presence of a guided route, assigning a highest priority to a branch road belonging to said guided route, and in the absence of a guided route, assigning a highest priority to a branch route based upon said road type, said road width, and said road curvature.

12. The route consideration method according to claim 11, wherein, among said branch road type, said branch road width, and said branch road curvature, assigning priority to said branch roads such that a relatively highest priority is accorded based upon branch road type, and
 when plural branch roads are of the same type, a relatively highest priority is accorded based upon branch road width, and
 when plural branch roads are of the same width, a relatively highest priority is accorded based upon branch road curvature.

* * * * *